(12) United States Patent
Ruegg et al.

(10) Patent No.: US 11,223,937 B2
(45) Date of Patent: Jan. 11, 2022

(54) SYSTEM AND METHOD FOR PROVIDING EXPANDED COMMUNICATION COVERAGE

(71) Applicants: Gary Ruegg, Mesa, AZ (US); Gregory Biltz, Payson, AZ (US); Glen Merrill, Phoenix, AZ (US); Xingshan He, St. James, NY (US); Ernest Doyal, Chandler, AZ (US)

(72) Inventors: Gary Ruegg, Mesa, AZ (US); Gregory Biltz, Payson, AZ (US); Glen Merrill, Phoenix, AZ (US); Xingshan He, St. James, NY (US); Ernest Doyal, Chandler, AZ (US)

( * ) Notice: Subject to any disclaimer, the term of this patent is extended or adjusted under 35 U.S.C. 154(b) by 0 days.

(21) Appl. No.: 15/705,356

(22) Filed: Sep. 15, 2017

(65) Prior Publication Data

US 2021/0219121 A1 Jul. 15, 2021

(51) Int. Cl.
*H04W 4/90* (2018.01)
*H04W 4/10* (2009.01)
*H04M 1/72466* (2021.01)
*H04M 1/72412* (2021.01)

(52) U.S. Cl.
CPC ......... *H04W 4/90* (2018.02); *H04M 1/72412* (2021.01); *H04M 1/72466* (2021.01); *H04W 4/10* (2013.01)

(58) Field of Classification Search
CPC ..... H04W 4/90; H04W 4/10; H04M 1/72466; H04M 1/72412
See application file for complete search history.

(56) References Cited

U.S. PATENT DOCUMENTS

| | | | | |
|---|---|---|---|---|
| 5,007,050 A | * | 4/1991 | Kasparian | H04B 1/56 370/280 |
| 5,020,135 A | * | 5/1991 | Kasparian | H04W 88/02 370/277 |
| 6,606,506 B1 | * | 8/2003 | Jones | H04B 1/207 455/556.1 |
| 2004/0192353 A1 | * | 9/2004 | Mason | H04B 7/18595 455/457 |
| 2007/0111754 A1 | * | 5/2007 | Marshall | H04B 1/44 455/556.1 |
| 2012/0178442 A1 | * | 7/2012 | Martinez | H04W 88/06 455/426.1 |
| 2014/0342780 A1 | * | 11/2014 | Ruegg | H04M 1/026 455/566 |

* cited by examiner

*Primary Examiner* — Dong-Chang Shiue (57) ABSTRACT

A system and method are provided for improving radio system coverage and functionality by integrating and sharing the radio speaker microphone with a mobile device connected with a commercial carrier. The system and method allows:
i) The radio system coverage to be seamlessly enhanced with the coverage area of the commercial internet and then to anywhere there is internet access.
ii) Secondary audio paths provided over the same speaker microphone
iii) Full duplex "hands free" communications provided for teams requiring the capability
iv) Remote control of the user's communications device
v) Remote programming of radios supporting a serial interface programming capability
vi) Sensor alerts for individual users to be sent through communication channels to defined users.

16 Claims, 10 Drawing Sheets

SYSTEM AND METHOD FOR PROVIDING EXPANDED COMMUNICATION COVERAGE

RELATED APPLICATION

This application claims the benefit of U.S. Non-Provisional Application No. 20140342780, filed Dec. 6, 2012, entitled "System and apparatus for expanding the capability of existing land mobile radio systems by embedding a wireless modem together with a processor, memory and one or more external interfaces into a speaker microphone that attaches to a land mobile or portable radio. The wireless data modem is then used to communicate with external data servers," which is incorporated herein in its entirety by this reference.

FIELD OF INVENTION

This invention relates to systems and methods for wireless communication, LMR radio, cellular telephony, Internet-based systems and methods, software, computers, or a combination thereof. More particularly, the invention relates to a system and method for providing redundancy for the LMR radio systems and expanded communication capabilities in areas without LMR radio connectivity or coverage.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever in such included copyrighted materials.

BACKGROUND

Organizations desiring enhanced communication capabilities, such as agencies with field personnel, require the ability to reach out to all desired recipients simultaneously or through defined subgroups with a one-to-many talk path. Examples may include fleet management, public safety, hospital maintenance, educational institutions, business sectors, etc. Such organizations are also often in need of an open communication flow with each individual user to ensure that communication to and from every individual is timely, available, and reliable. While the need for this type of communication is applicable to all sectors, including those listed above, there is no sector where the gap in communications is more dire than with first responders.

Communication systems utilizing radio coverage capabilities are restricted by the power and location of the applicable antennas and the availability and cost of radio frequency licenses. In addition, the legislative system has not kept pace with the need for bidirectional amplifiers to enable people to have LMR radio coverage within a building; instead the building itself blocks coverage. While entities have attempted to address this problem by utilizing cellular devices, this solution faces several limitations including an unstructured reliance on private cellular networks; restriction to one-to-one calls unless a time-consuming conference is set up; the need to have prior knowledge of all parties' contact information; an echoing effect of cellular latency, and the limitation of communication modes to the restrictions of the cellular devices. In addition to the blocking by a building, there are many reasons that the connection through an LMR radio system can be lost. The current invention, under standard cellular phone (or broadband) coverage, can correct that loss, regardless of the cause, in a manner that minimizes or eliminates any gap in the communication transfer without facing the same limitations of the mere use of a separate cellular device.

Currently there is no redundancy built into the LMR system to address system failure or out-of-coverage communications. If the radio becomes inoperable (obstructions; dead spots caused by terrain, buildings, or foliage; battery dies, separation from the user, etc.), an individual utilizing the current LMR radio system would be left totally without communication capabilities. Furthermore, the user may be completely unaware when such loss of communication capability occurs. Rather than attempt the impractical and expensive addition of multiple bidirectional amplifiers in every building for every frequency utilized by a radio system user that may enter the building, or the installation of additional radio towers, which would only address a small portion of the causes for communication loss over a standard LMR radio system, this invention utilizes the standard cellular phone amplifiers that have already been installed to support communication coverage.

There are currently applications available that can transmit radio over cellular devices; however, this solution a requirement that the user knows their home radio coverage is not available; the user being able, in a timely manner, to make the required adjustment within the user's mobile phone settings; and the potential lack of awareness that any communications sent by others was lost. The current invention automatically detects such loss of coverage and supplements the defect by providing the communications via the smartphone to the same speaker-microphone utilized by the LMR radio, effectively eliminating any gap in communication. In addition, the current invention makes available replay of any audio received over the radio, thus further improving the accessibility to the communications.

Even if an organization accomplished the impractical and costly addition of antennas to its own system, such solution would not improve the coverage when an individual goes out of the coverage area of the radio system or the radio battery dies or otherwise becomes inoperable. The current invention enables that expanded communication coverage for significantly less cost and for a wider area of coverage.

Despite the known deficiencies in LMR, the need for LMR radio communications among organizations, especially for first-responders and other personnel needing time-sensitive data and information from multiple sources, will not be decreasing. While each individual within a communication group may carry a cellular device for communication when radio coverage is unavailable, the use of such a device is problematic. The cellular device is primarily a one-to-one communication mechanism. The cellular device does not allow for ease in the functionality of multiple levels of many-to-many communication capabilities. It also lacks the controls needed by a command center for continued vital side communications during a cellular conference call.

The current invention gives the user the ability to dynamically create multiple many-to-many conversations in a quantity sufficient to effectively accomplish the necessary tasks. For example, first responders responding to an incident can dynamically create a many-to-many talk path allowing all responders from all responding agencies to communicate with each other while simultaneously maintaining the communication channel with local command and control for their respective organizations through the radio.

First responders use the radio system for emergency (I need help) or command and control. When an emergency occurs, the first command issued may be, "Everyone stay off the radio" to ensure that the path remains available for that incident. The remaining responders are forced to abandon the command and control channel to communicate. Currently there are no solutions to this gap other than random private communications between parties utilizing cellular devices or other communications means. The problems arising out of this solution are numerous, but a major issue is that while assuring the communication channel is clear for the defined primary incident, all other emergency situations take a 'back seat' to the primary and can be escalated to a crisis that could have been avoided if proper communication had been available. Even during something as simple as escort duty for a funeral procession, when the trailing officer needs to stop the procession, he is forced to use his cellular phone to communicate with the officer leading the procession. Since the current invention integrates the speaker microphone with both the cellular device and the LMR radio by prescribing a second PTT button for secondary audio path communication, users no longer need to take out a smartphone and dial someone. They are always connected with those with whom they are working via the secondary audio path.

Communication is vital to any emergency situation, most often so is the ability to use both hands. The radio system cannot transmit communications unless the user is holding down the PTT button. The current solutions may involve a second person or use of a cellular voice activation. The limitations of these solutions are the frequent times that a second person is not available and the need for rapid response does not allow for the cellular device to be in a location where continued voice activation is reliable. The current invention resolves this issue by providing a secondary audio path that is full duplex (sends and receives at the same time). The secondary audio path is set to "hands-free," uses the cellular device audio path and may not contain a radio system interface in the conference.

During multi-jurisdictional response events, communications can be limited due to the separate radio frequencies for jurisdictions and the need to maintain communications with one's own jurisdiction while also communicating across another frequency. The current solutions include talk groups for LMR systems and conference groups for cellular devices. The limitations with these solutions are caused by the need to utilize multiple devices (both radio and cellular), often requiring the use of both hands, while still attempting to respond to the emergency situation.

The LMR systems do not allow for sharing multiple modes of communication such as videos, mapping, and text data. Even though the LMR may be supplemented with cellular devices, the responders still face the challenges resulting from the need for the ability to make rapid responses, the required preparation to assure all the proper contact information for all parties is available and current, and again, the inconvenience of reliance on multiple devices during a crisis response situation.

Currently, whenever updates are required, each LMR communication device has to be brought into the maintenance facility and hooked to the server for the upgrade to download. While some over-air reprogramming is currently available for devices, the LRM devices need to each be newer models that allow for the over air programming, which for many entities is cost prohibitive and thus, limits the availability only to those newer devices. The current invention resolves this issue with the ability to dynamically modify the radio programming over the broadband through the serial interface to the radio. This capability is only restricted by the radio's ability to support serial interface programming.

It is an object of the present invention, among other things, to provide a system and method that allows an organization and its users within an institution or enterprise to enhance communication, whether through voice, video, or even data, to meet the needs described above.

Potential for improvement exists in these and other areas that may be apparent to a person of skill in the art having studied this document.

SUMMARY OF PARTICULAR EMBODIMENTS OF THE INVENTION

The contents of this summary section are provided only as a simplified introduction to the disclosure, and are not intended to be used to limit the scope of the appended claims.

The invention utilizes a commercial off the shelf radio to SIP interface to connect a radio system to a SIP based PBX server. This allows the server application to collect and record audio from the radio system. The collected audio is then re-broadcast over broadband to smartphones providing a redundant alternate audio source to users in the field. The smartphone maintains a connection to a custom speaker microphone that is used with a user's portable or mobile LMR. The custom speaker microphone, while functioning as a traditional speaker microphone with respect to the radio system, also communicates with the smartphone to send (Tx) or receive (Rx) status of the radio. The custom speaker microphone handles commands coming in from the smartphone and audio from the smartphone is played over the speaker. It transmits all the audio coming from the radio or the microphone to the smartphone. When audio is received by the LMR, it is sent to the speaker microphone SM1 to be played over the speaker (or its connected ear bud). At the same time, a radio system status change is sent to the smartphone indicating the LMR is now in Rx mode, and the incoming audio is also sent back to the smartphone for recording. When the user presses the PTT button to transmit audio over the radio system, the speaker microphone sends the status change (radio now in Tx mode) and audio spoken by the user is sent to the smartphone for recording and transmission over broadband back to the system radio device attached to the PBX Server. When audio is received by the user's smartphone that is coming from the redundant broadband source, the smartphone checks to see if it is already recording the audio coming in from the user's LMR. If it is not being recorded, the smartphone sends the audio from the broadband source to the speaker microphone for transfer to the speaker. The user does not miss the audio.

Another method expanding the radio system communications capability according to the current invention includes providing a secondary communication path for the LMR radio user. When several users need to communicate as team members they can use a pre-established named communication conference for example "field team 3," or they can dynamically establish a new communication channel for the specific task at hand. The user can then set the conference as the "Home" conference, such that whenever the second PTT button is depressed on the speaker microphone SM1, the audio is transmitted to the other users connected to that conference. When other team members transmit on the named home conference the user hears the audio over the speaker microphone. A user can optionally elect to have a tone precede audio coming from the smartphone to audibly differentiate LMR traffic from smartphone traffic.

The invention supports a group of users, some or all of whom may want to be "hands free." Thus, a fire entry team can have a commercial off-the-shelf, in-ear transmitter and speaker connected to the speaker microphone. The team members set the speaker microphone to hands-free mode prior to entry. The LMR radio system maintains for them the connection to command and control. The smartphone maintains the hands-free communications between the fire team members without disruption to the LMR radio system.

Additionally, the invention enables a dispatcher or supervisor to remotely control a user's device. The user can request dispatch to make an audio connection, start video transmission, end video transmission, take a picture and upload it.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention. The drawings illustrate, among other things, various particular examples of embodiments and methods, and certain examples of characteristics thereof. Different embodiments include various combinations of elements or acts shown in the drawings, described herein, known in the art, or a combination thereof.

FIG. 4 (Rx) is a block diagram illustrating the normal data paths when audio is received at the radio system from an external radio R2. In this situation, a signal is received at the Radio System Antenna from R2. It is passed on to the System Radio (SR1) and at the same time goes to R1. R1 sends the audio to SM1 where it is both played out the speaker and is also forwarded to SP1 for recording. At the same time, the audio is also received by SR1 then passes up the Rx channel to the App Server where it is sent to all system channel users over broadband. Thus, the audio is received at SP1. At SP1, the audio is recorded. If the audio is also being recorded from SM1, nothing else is done, as reflected in this figure.

FIG. 4 (Tx) illustrates the normal data path when audio is transmitted by R1 to an external radio R2. In this case, the user speaks into SM1 while depressing the Radio PTT button. The audio goes to both R1 and SP1 over Bluetooth, wireless or similar connections. R1 transmits the audio to the Radio System Antenna and/or directly to R2 when the radio system is a conventional, non-repeated system. When the radio system is repeated, the audio is processed by the LMR system and forwarded back over the Radio (LMR) System Antenna to the external radio R2. At the same time, SP1 receives the audio and sends it over the internet possibly through an optional Virtual Private Network (for secure encrypted transmission) to the App Server from which it is sent through the transmission channel to SR1. At this point SR1 is busy and in receive mode as the audio is already coming from the Radio System Antenna (which will always arrive first) and so the audio is ignored.

FIG. 5 (Rx) is a block diagram that describes the audio path in situations where the R1 is not functioning due to coverage failure, a dead battery, or any other radio malfunction. When audio is transmitted by an external user R2, the audio is received by the SR1 then passed up the Rx channel to the App Server where it is sent to all system channel users over broadband. The audio is received at SP1. Since there is no audio coming from the LMR via the SM1, SP1 sends the audio to SM1 for playing and records the audio for playback.

FIG. 5 (Tx) when the user depresses the radio PTT button on SM1 to transmit audio over the LMR, the audio travels from SM1 to SR1 which is non-functioning, but the audio signal also travels via Bluetooth or other wired or wireless connection to SP1 and is sent over the internet optionally through a Virtual Private Network (for secure encrypted transmission) to the App Server from which it is sent through the transmission channel, Tx, to SR1. SR1 then transmits the audio over the radio system for the user. The audio is then forwarded to the external radio R2 from the Radio System Antenna.

FIG. 6 (Tx) is a diagram illustrating the transmit data paths that occurs when two users, with R1 and R2, are both out of range of the Radio System Antenna and out of range of each other. When the user with R1 depresses the radio PTT button on SM1 to transmit audio over the LMR, the audio travels from SM1 to the radio R1 but it cannot reach the Radio System Antenna so it goes no further; however, SM1 also sends the audio via Bluetooth or other wired or wireless connection to SP1, and the audio is then sent over the internet, optionally through a Virtual Private Network (for secure encrypted transmission), to the App Server from which it is sent through the transmission channel, Tx, to SR1. SR1 then transmits the audio over the radio system for the other system users. The Tx conference is bi-directional so the audio also goes back out the Tx conference from the App Server over the internet to SP2, which would normally ignore it since audio is being received by the radio at the same time. However, since R2 is also out of range, there is no other signal, so SP2 sends the Tx signal to SM2 for playing.

FIG. 7 (Tx) is a diagram illustrating the transmission data paths when two users, with R1 and R2, are both out of range of the Radio System Antenna but are within range of each other. When the user with R1 depresses the radio PTT button on tSM1 to transmit audio over the LMR, the audio travels from SM1 to R1 where it is received by R2 and then travels to SM2 and is played over the speaker. The audio being transmitted by R1 is also being sent via Bluetooth or other wired or wireless connection to SP1 and is sent over the internet, optionally through a Virtual Private Network (for secure encrypted transmission), to the App Server from which it is sent through the transmission channel, Tx, to SR1. SR1 then transmits the audio over the radio system. Thus, the audio becomes fully incorporated into the overall radio system, available to all other in coverage users, as well.

DETAILED DESCRIPTION OF EXAMPLES OF EMBODIMENTS

Figure 1:
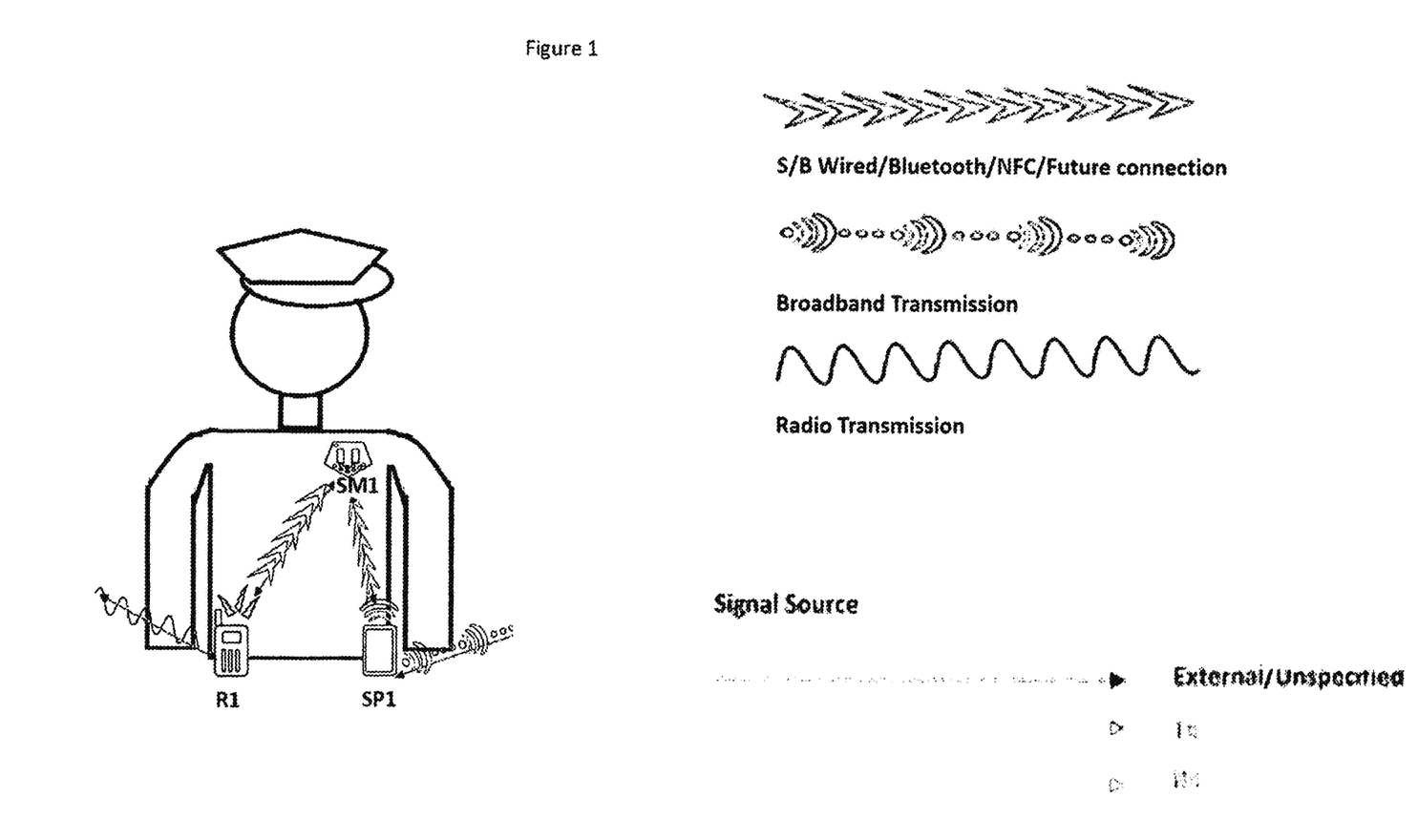
FIG. 1 is a block diagram illustrating one embodiment of a system that can be used for providing seamless radio coverage. In this embodiment, a user has a smartphone (SP1), a portable radio (R1), and a speaker microphone (SM1) that is connected to both R1 and SP1. The connection from the radio transmission, or LMR, through R1, to SM1 is shown as wireless but may very well be a wired connection. SM1 amplifies the audio from both the LMR system through R1 and SP1. The audio when played, from one or the other or both devices can be optionally preceded by tone to indicate the source of the audio.
Figure 2:
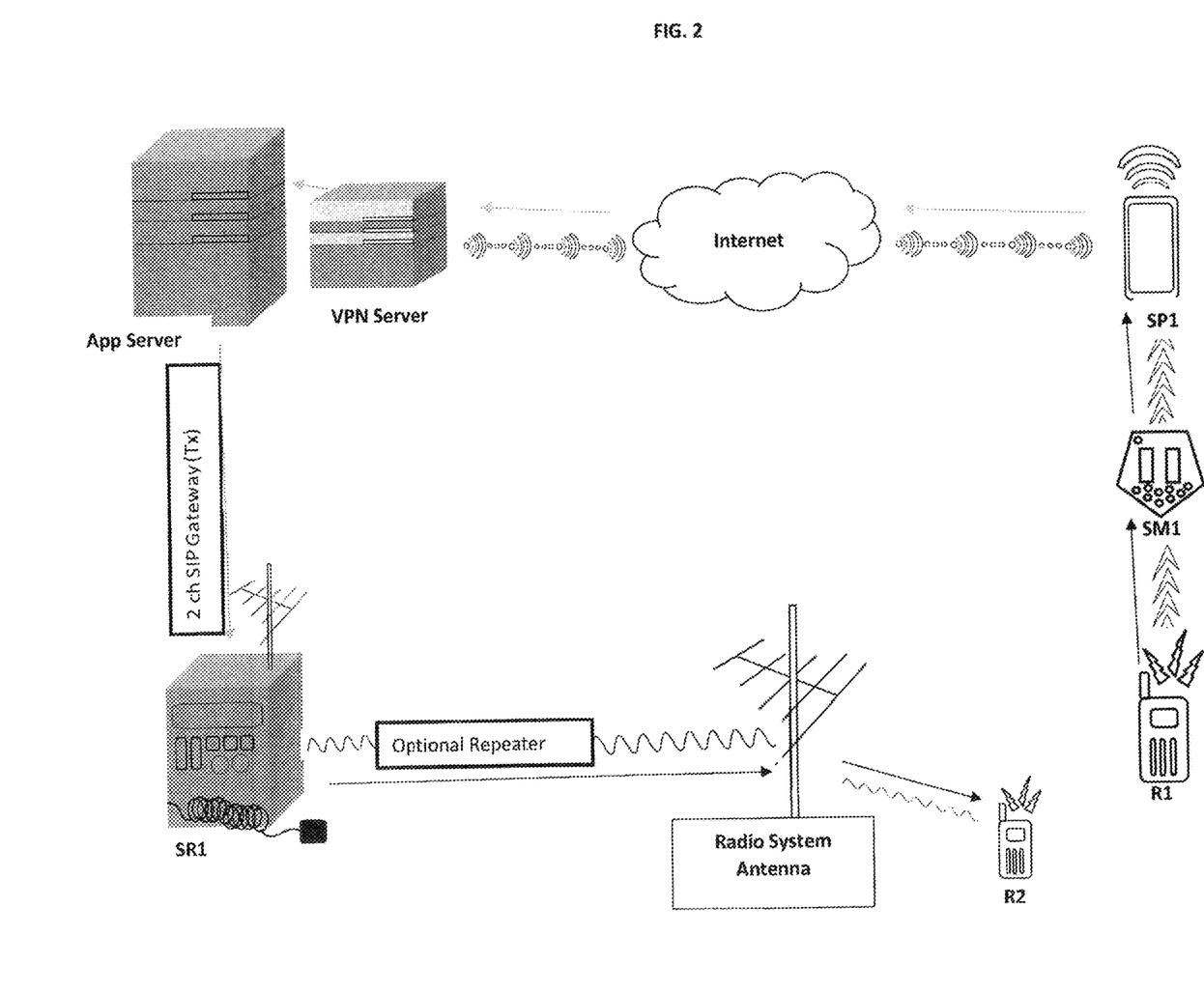
FIG. 2 is a block diagram illustrating the interaction of the three devices when the radio is out of coverage, has a dead battery, or for whatever reason is not functioning when audio is transmitted over the LMR radio system.
Figure 3:
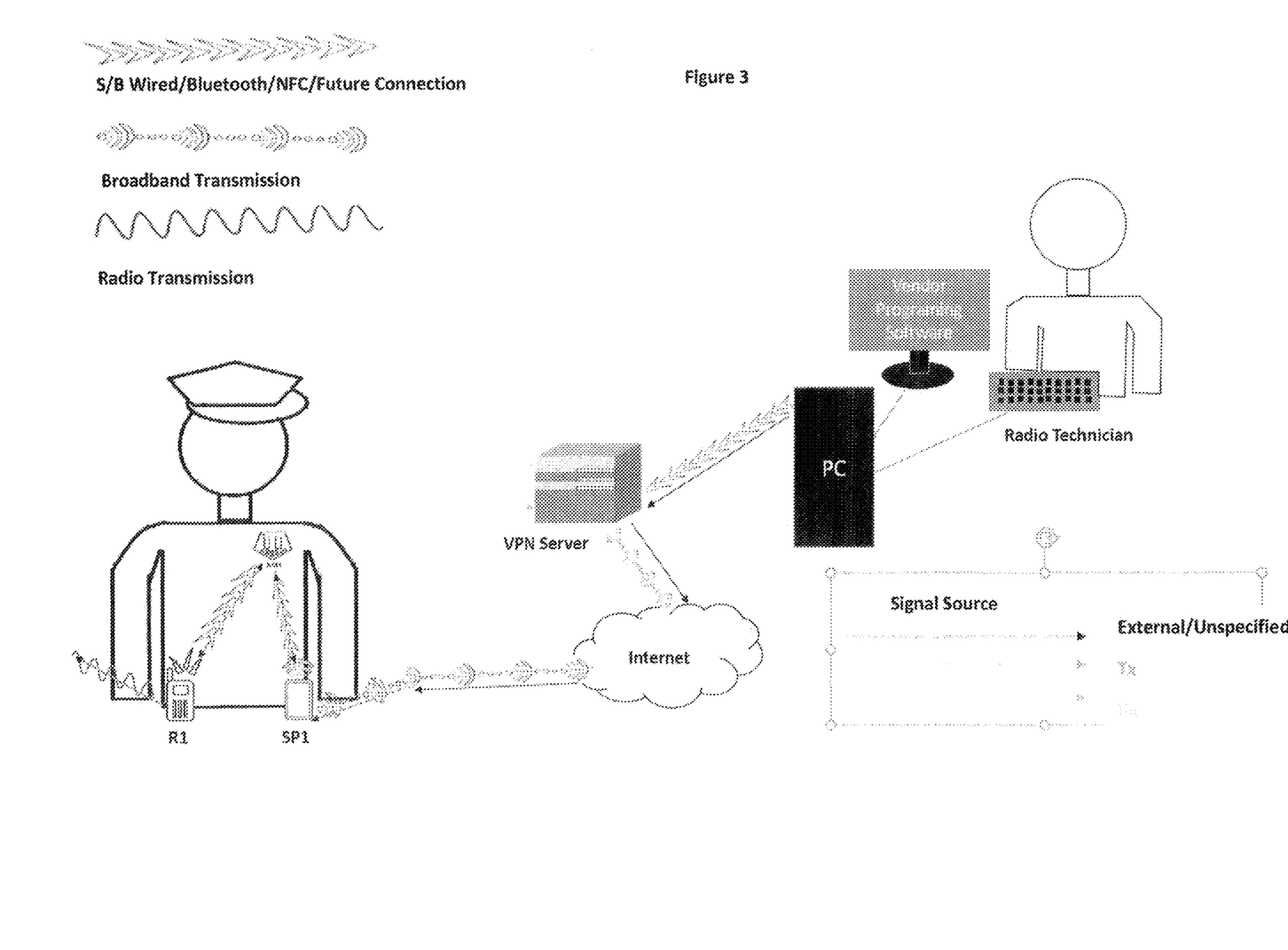
FIG. 3 illustrates the fact that the current invention utilizes both hardware and software components in SM1 and also has software components within SP1. SM1 has the additional hardware necessary to pass audio over Bluetooth (or other similar wired or wireless connection) to the smartphone as well as a cable, Bluetooth or other connection to pass audio to the LMR device. It also has software and hardware providing the capability to detect and communicate status to the cellular device. It can optionally also have hardware and software to support a serial interface to the LMR device to support over the air keying or programming depending on the individual radio's capability for serial interface keying and/or programming. SP1 has a software application to manage both the connection to SM1 and also the transfer of information between SP1 and the App Server.
Figure 4:
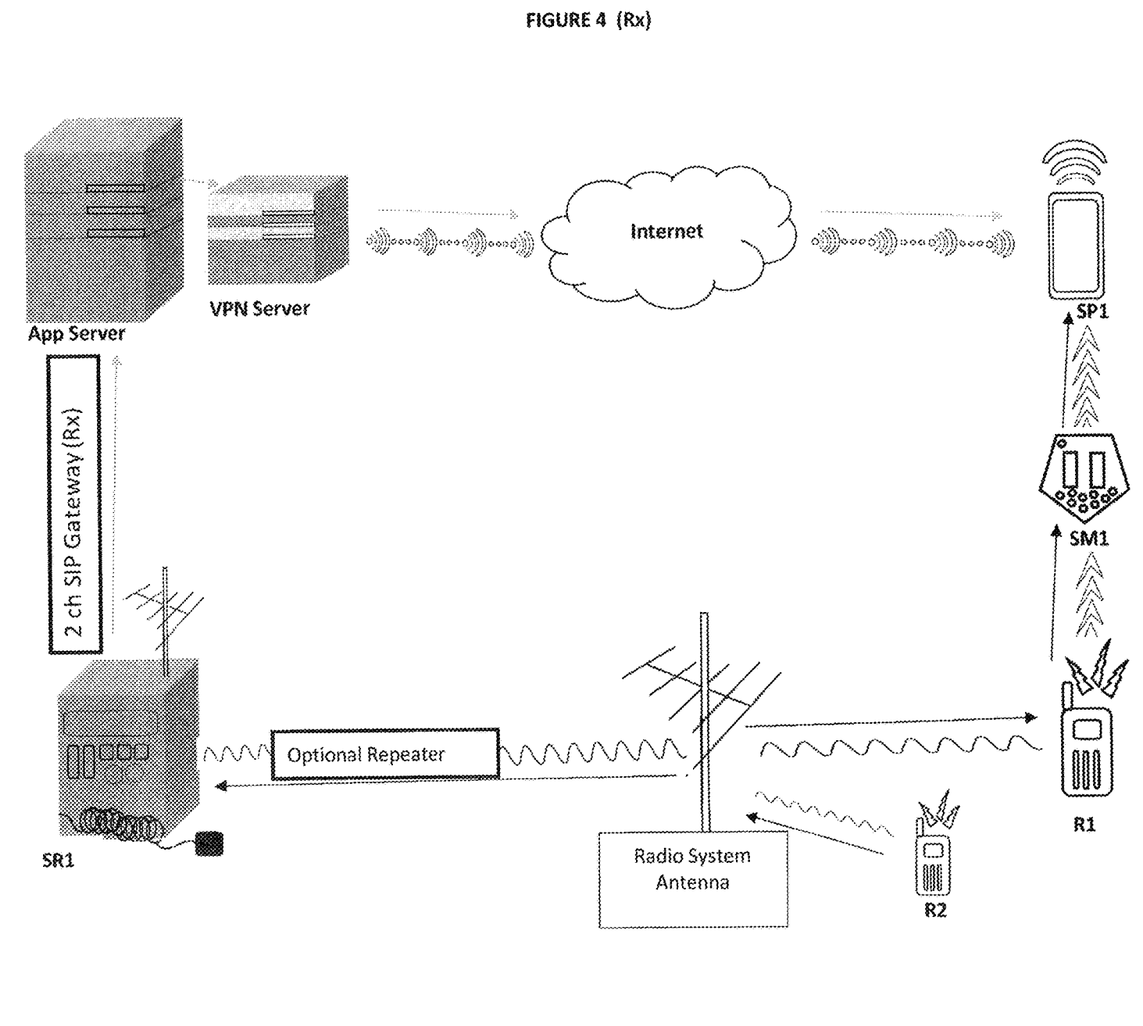
Figure 5:
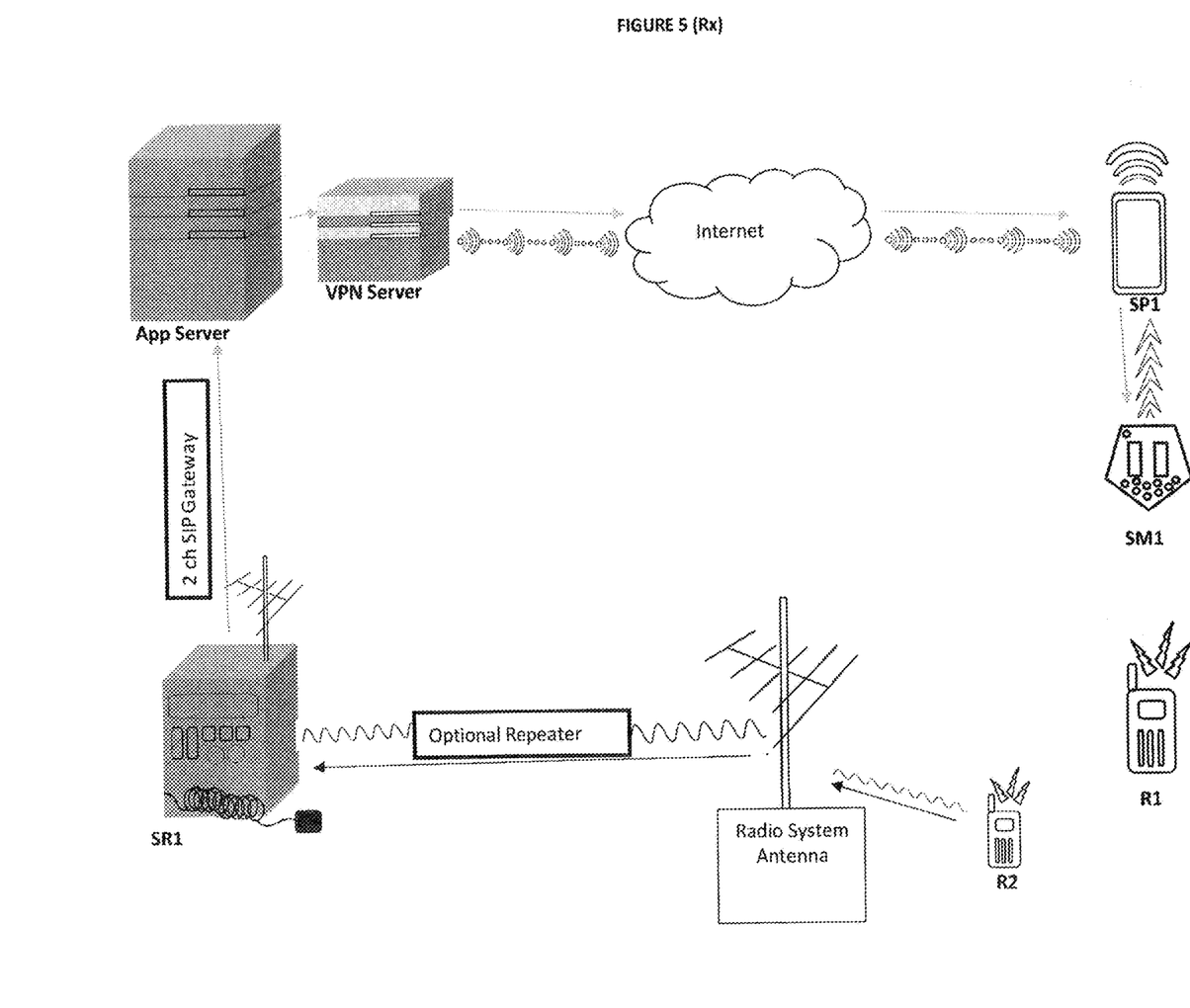
Figure 6:
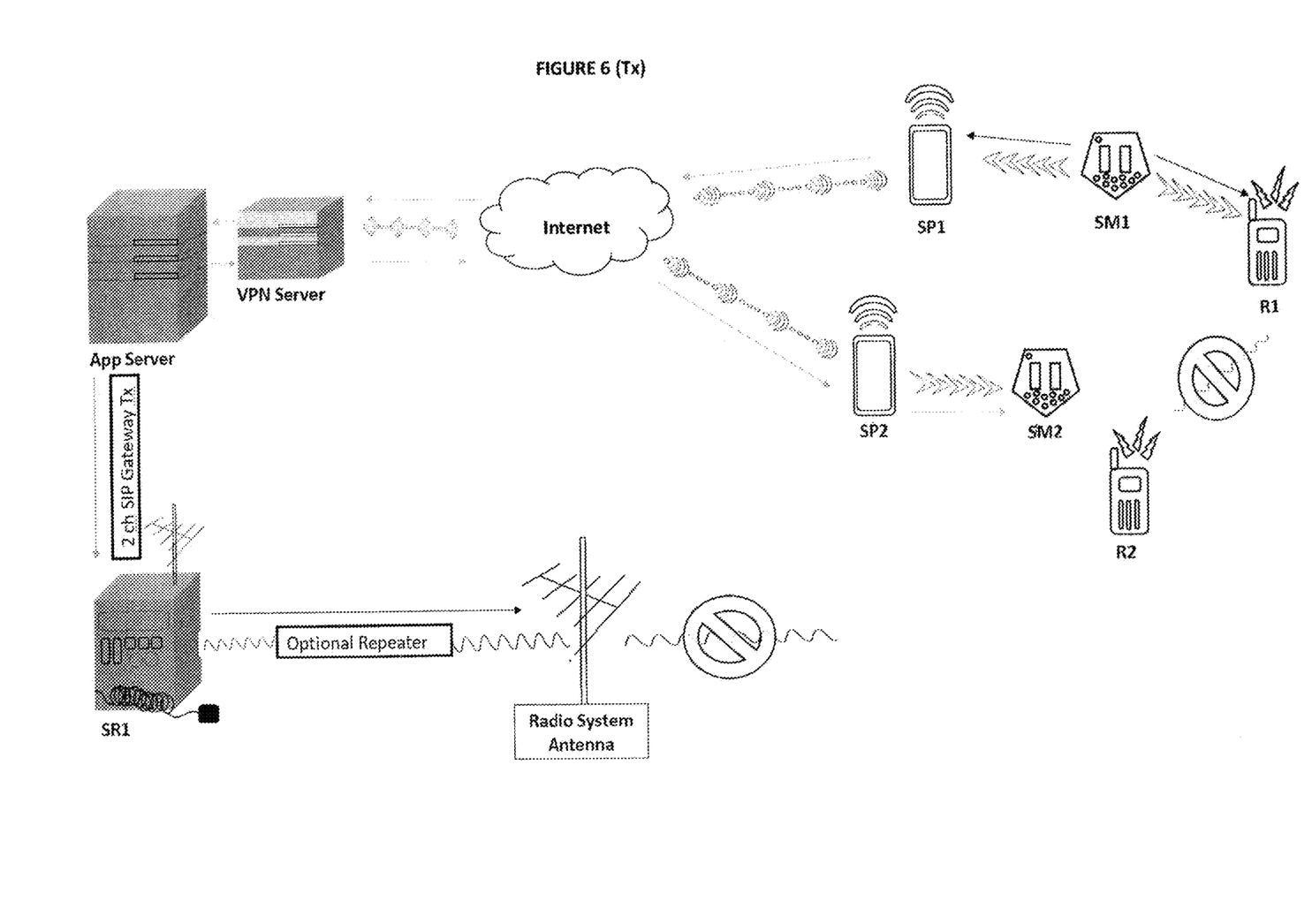
Figure 7:
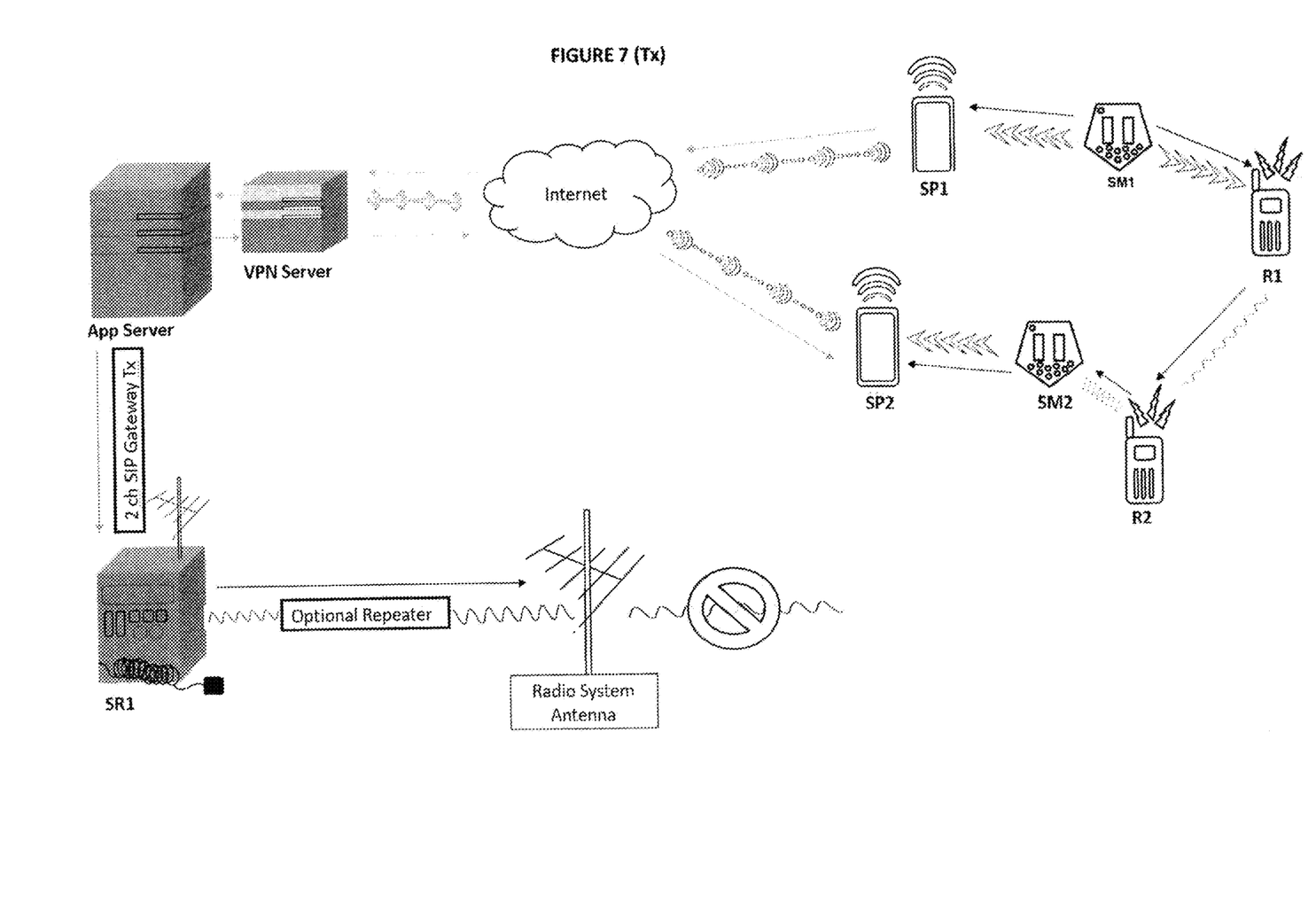
Figure 8:
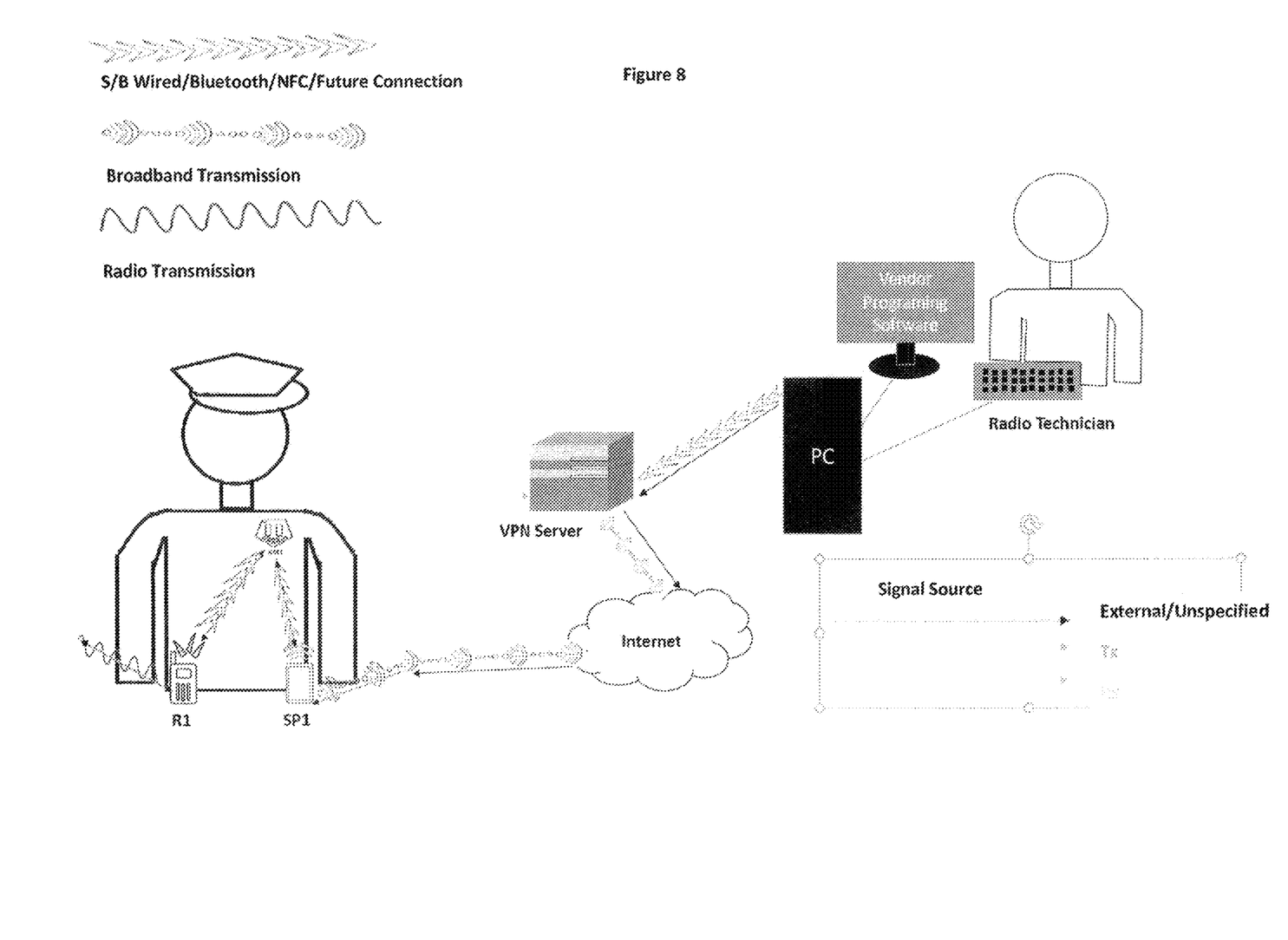
FIG. 8 is a diagram illustrating a technician updating the programming on a radio in the field by substituting the serial interface cable to the radio with a serial to ethernet connection over broadband to the connected cellular device which uses the speaker microphone serial pass through to the radio.

The present disclosure provides, among other things, a number of embodiments and methods for managing seamless radio redundancy and for recording such communications. While various embodiments and methods are described in sufficient detail to enable those skilled in the art to practice the invention, it should be understood that other embodiments may be realized and that various changes may be made without departing from the spirit and scope of the invention. Thus, the detailed description herein is presented for purposes of illustration only and not of limitation. For example, the steps recited in any of the method or process descriptions may be executed in any order and are not limited to the order presented or the types of connections presented.

Moreover, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical and/or electronic couplings between the various elements. It should be noted that many alternative or additional functional relationships or physical or electronic connections may be present in a practical system.

As used herein, reference to a "smartphone" or "cellular phone" may be any device configured for transmitting and receiving electronic communications, for example a cellular phone, a satellite phone, a personal digital assistant (PDA), a tablet computer, a desktop computer, laptop computer, netbook, portable device for communication, or the like. Throughout various exemplary embodiments illustrated or discussed in this disclosure, any such mobile device may be referred to herein as a "smartphone" or "cellular phone," but it should be understood that it may have other functionality or be any other type of mobile device.

The App Server can reside, for example, within the data center of the business or in the cloud. The communications can be sent to the App Server using the Internet or other networks. In some embodiments, there may be multiple communication gateways involved in routing of the messages.

In an embodiment in which the communications need to be secured the business will obtain its own instance of the App Server and will employ a VPN Server to provide end to end encryption of all communications traveling between the smartphones and the App Server.

There are two configurations of radio system devices. In one configuration, a single mobile or portable radio is used but is cabled to two SIP interface devices one for the Rx path and one for the Tx path. In the second configuration, two radios are used. In that configuration, each radio is cabled to a unique SIP interface device. One of the radios is used for the Rx path, and the other for the Tx path.

Use Cases

The following examples help to explain the use of the system and method of the present invention.

Utility Linemen: While a utility company will have a radio system with sufficient coverage to cover the entire service area, there will always be cases where the foliage, terrain, or other obstructions interfere with the radio signals. When a storm brings down power lines it can require multiple crews to respond. Linemen in buckets examining transformers and power line connections need to communicate with the crew on the ground and occasionally with engineers in the office. With the current invention, the linemen are always connected to their base as long as there is either cellular coverage or radio coverage. From the lineman's perspective, the radio system will no longer break up or lose signal. In addition, the lineman now has a separate communication capability with those working directly with and directly supporting him/her. When the lineman needs to communicate with team members, the SIP (cellular) button on the speaker microphone can be utilized. When the lineman needs to communicate with base, the radio button on the speaker microphone can be utilized.

Small Town First Responders: A small town has both public safety and public services. It maintains a radio system that uses a single radio frequency with Private Line (PL) tones to support private communications with each agency. With the current invention, they are able to have unlimited talk groups for each of the agencies over broadband. In addition, when an accident occurs on the highway, an event conference can be created, and police, fire, and EMS personnel can communicate with each other along with the road crew to arrange for clean up after the accident. Many small towns are unable to afford multiple app servers, so instead, with the current invention, they are able to connect to a single cloud based service provider to which they link each of the agencies' radio systems. Each responder can then also be connected to the cloud based service so they all get the supplemental coverage provided by their broadband providers' coverage.

Radio Manufacturer providing customer coverage services: A radio equipment manufacturer may want to be able to offer expanded coverage to all its radio users. By combining this invention with integration to global cloud providers, radio customers can point mobile radios to the cloud for each frequency they are deploying to enable anyone configured to their radio system to have system access anywhere in the world.

Hospital communications for doctors, nurses, maintenance, medical cart, and food service personnel: Individuals working in a hospital setting need bi-directional amplifiers for the various cellular service providers so that their cellular phones work anywhere in the hospital and often would not want to carry a separate radio. By deploying an App Server connected to the radio system, such personnel can have access to the radio system right from their cellular phone enabling instant access to all other personnel. Under the current invention, their phones would then operate in the same manner as if an attached radio had a dead battery.

School providing classroom intercom with capability to connect to public safety: With the current invention, a school system could connect a radio to an App Server (provided by the school district). The radio would have one or more shared public safety frequencies programmed into it. Each teacher would then connect their cellular phone to the district server, enabling the teachers to use the App Server as an intercom, providing conferencing for different groups of teachers upon demand. In addition, should there be an emergency on campus, the district can instruct the responders as to the available frequencies for direct access to the teachers. That way, if a child has a seizure the teacher can calls 911, and the 911dispatcher can then connect the responder to the school radio frequency. This allows the responders to communicate directly with the teacher, even enabling the sharing of images and video of the patient while in route to the school.

Fire Entry team using hands-free and sensor interface(s): Fire entry teams work in small groups and need to maintain continual contact with the other team members in an environment where visibility is often less than a foot and the fire is roaring so loud nothing can be heard. With the current invention, the fire personnel can obtain commercial off-the-shelf inner ear speakers and microphones that connect to the custom speaker microphones to allow the fire personnel to communicate in a normal voice and hear and be heard by their team members. With the "hands-free" feature, the fireman's radio stays connected with command and control, and the firemen communicate hands-free by simply talking to their team members through the broadband connection. The fire personnel wear their masks to provide oxygen in the smoke. When the smoke clears, the temptation is to remove the masks. There are obvious dangers that can occur once the firefighter's mask is removed, such as cyanide poison given off when Styrofoam burns. Fire personnel frequently carry detectors that can alert the wearer of the danger; however, with the current invention, the detectors can connect via Bluetooth to the smart phone and App Server to warn all the team members simultaneously of the presence of the gas.

Pipeline using mobile deployment with satellite backhaul: Pipelines extend into areas that are not supported with any service except satellite. There are commercial products that provide mobile cellular service that connect to a satellite for backhaul. A user can configure a portable App Server on an Intel NUC or other portable server to connect to the commercial backhaul router to enable local communications between personnel in the field without utilizing the expensive satellite backhaul. However, when necessary, the communications can travel over the backhaul to report or obtain assistance required.

An off-duty police officer arriving on an accident scene and needing additional support: If the off-duty police officer on scene has a multiband radio and his cellular device, but the officers required for additional support do not have cellular devices and are on a mutual aid frequency that is unavailable on his radio, the off-duty officer can turn on his radio and ask for the communications technician. To enable communications with the supporting officers, he can give the required frequency to the technician and initialize a programming mode. The technician can read the current load on the officer's radio then add the new frequency and write the load back to the radio. The officer can then communicate.

MOBILE SOFTWARE DETAILS ENHANCED COVERAGE

The application that is installed on the user's cellular device maintains the connection to the speaker microphone and a broadband connection to both the application management component and the SIP based PBX for audio and video sharing. The cellular device's software transparently makes some connections to the PBX based on the user's personal configuration on the system.

When the cellular device is configured for supplemental radio coverage the radio interfaces for each of the SIP audio paths (Rx and Tx) are identified. The cellular device software connects the broadband devices to each of those conferences. In order to transparently give a user audio coverage, regardless of location, audio will be filtered based on 3 sources:

a) The first source is the user's portable radio. This functions as it does today and will play out of the speaker microphone (SM1). This audio is also sent via Bluetooth for potential replay and so that the smartphone application can detect that audio is being received over the radio.
b) The second source is the Rx SIP conference. If no audio is being received by the radio (R1) then the audio from the Rx SIP conference will be sent to the speaker microphone (SM1) via Bluetooth.
c) The third source is the Tx SIP conference. If no audio is being received by either the radio (R1) or the Rx SIP conference, then the audio from the Tx SIP conference will be sent to the speaker microphone (SM1) via Bluetooth.

Here are some examples when each source is used:
1. Radio: When two users are within radio coverage, then audio is received normally over the radio. If there is no radio or the radio is turned off, then only the last 2 sources are used.
2. Rx SIP conference: When one user is within radio coverage and the other is out of coverage, then the in-coverage user's audio is received by the Rx SIP conference via the radio and sent to the out-of-coverage user via the Rx SIP conference. The out-of-coverage user's audio is sent back via the Tx SIP Conference and sent out through the radio.
3. Tx SIP conference: When both users are outside of radio coverage, then audio is sent by both users via the Tx SIP conference and sent out via the radio. Since both users are out of coverage, they receive the audio through the same Tx SIP conference while any other in-coverage users receive it over the radio.

Mobile Software Details Secondary Audio Paths

The application installed on the user's smartphone allows the user to select one or more alternate audio paths. Each user's configuration on the server application maintains a default secondary audio path. The smartphone application maintains the connection to the SIP based PBX. In addition to the default secondary audio path, the course of a user's work may require connection to a temporary, event-based conference (response to an accident, temporary duty). The smartphone software application provides notifications of events to users identified in the system and allows the user to indicate that he/she is responding to the temporary event. That selected event now becomes the user's default secondary audio path.

The user may also select additional audio paths to be monitored. This allows a supervisor to monitor several teams at the same time.

When audio arrives over any of the selected paths the system records all incoming audio from all sources. When audio from multiple audio sources arrives simultaneously the audio is prioritized as follows:
 a) LMR Audio (audio coming in from the LMR itself)
 b) Rx Audio (audio coming in from the radio system when the user is out of coverage)
 c) Tx Audio (Audio coming in from the radio system when both this user and the sending user is out of coverage)
 d) Default Conference (the user's currently assigned primary broadband conference)
 e) Talk and listen conferences on a first come basis
 f) Monitor conferences on a first-come basis When audio comes from the microphone with the broadband PTT depressed, the audio is sent out one or more selected conferences.

Mobile Software Details Hands Free

The application installed on the user's cellular device allows the user to select "hands free" on a conference that does not contain a radio interface when the user is using ear phones or an earbud. When the user selects the hands-free option, the smartphone application instructs the speaker microphone to open the microphone. All audio coming through the microphone is passed to the selected conference in a full duplex mode (audio is being sent and received at the same time).

When audio comes from the LMR or an additional audio path while the user is in hands-free mode, the user still hears the audio and, because the user is using an earbud or earphones, there is no transfer of the incoming audio over the open microphone.

Mobile Software Details Remote Control

The application installed on the user's cellular device allows the server to remotely control the device. The App Server can instruct a cellular device to take a picture, start a video recording, add a conference, set a conference to default, remove a conference, and disable the communications.

Mobile Software Details Remote Programming

When a user in the field wants direct communication access to individuals from another agency who do not have cellular devices but are willing to share access to a specific frequency. The user notifies his communications organization of the required change to his radio load. The communication technician requests connection information and the user sets the cellular device software to programming mode and the connection IP address is displayed for relay to the technician. The radio technician uses a commercial off the shelf serial to Ethernet redirection software and configures it to the users IP address. The new programming load is then transferred to the radio.

Server Software Details

The application installed at the server allows for the configuration of a variety of communication devices, telephones, radios, tablets, personal computers, or other devices. It manages the allowable communications by user, the roles performed by the user, and the user defaults.

The server application communicates with the client software for remote control of the device and to respond to requests for communications to audio and video resources.

What is claimed is:

1. A method of improving radio system coverage and functionality by integrating and sharing a speaker microphone, with a cellular device, and one of a land mobile radio or land mobile radio transmission capabilities within the cellular device, the method comprising:
 a speaker microphone containing hardware and software components that enable communications to and from a land mobile radio (LMR) and a cellular device;
 a cellular device containing software components that can send and receive communications to the speaker microphone;
 the method further comprising preventing duplicative messaging with cellular latency, consisting essentially of:
  a. The user speaking into the speaker microphone while depressing the LMR Push-To-Talk (PTT) button;
  b. The audio transmitting to both a LMR and cellular device over Bluetooth, wireless, or similar connections;
  c. The radio transmitting the audio to the Radio System Antenna and/or directly to a second radio;
  d. When the audio is repeated by the radio system, the audio is processed by the LMR system and forwarded back over the Radio System Antenna to the second radio;
  e. Simultaneously, the cellular device receives the audio and sends it over the internet or through an optional Virtual Private Network to the App Server;
  f. The App Server sends the audio through the transmission channel to a system radio; and
  g. The system radio is busy and in receive mode from audio transmitting from the Radio System Antenna, so the audio is ignored.

2. The method of claim 1 wherein the speaker microphone notifies the cellular device upon request or upon status change of at least one of the following statuses of the land mobile radio:
 a. Awaiting or receiving audio;
 b. LMR Push-To-Talk (PTT) Button is pressed;
 c. LMR PTT Button is released;
 d. Session Initiation Protocol (SIP) PTT Button is pressed;
 e. SIP PTT Button is released;
 f. Speaker is muted; or
 g. Speaker is unmuted.

3. The method of claim 1 wherein the speaker microphone notifies the cellular device upon request or upon status change of at least one of the following statuses of the speaker microphone:
 a. Low battery status (battery at or below ¼ charge)
 b. Serial interface to LMR active
 c. Serial interface to LMR terminated by radio.

4. The method of claim 1 where the speaker microphone prioritizes activity of information receipt based upon at least one of:
 a. Audio received by the Land Mobile Radio;
 b. Audio received via Bluetooth or other connection from the cellular device.

5. The method of claim 1 consisting of the speaker microphone passing the audio coming from the Land Mobile Radio to the cellular device for recording and enabling a replay.

6. The method of claim 1 allowing safety and other sensors to be connected to the system for communications allowing for broad notification of alerts.

7. The method of claim 1 of remotely programming a radio in the field while allowing end user unbroken LMR audio further comprises the steps of:
   a. User notifies communication organization of the required change;
   b. The communication technician request connection information;
   c. User sets the cellular device software to programming mode;
   d. Connection Internet Protocol (IP) address is displayed for relay to communication technician;
   e. Communication technician uses a commercial off the shelf serial to Ethernet redirection software and configures to user's IP address;
   f. Using the existing licensed radio programing software the communication technician transfers a new programming load to the users radio over the IP based serial interface.

8. The method of claim 1, when audio from multiple audio sources arrives simultaneously at the cellular device, where the cellular device prioritizes the audio receipt based upon at least one of the following:
   a. LMR Audio—audio coming in from the LMR itself;
   b. Receive (Rx) Audio—audio coming in from the radio system when the user is out of coverage;
   c. Transmit (Tx) Audio—audio coming in from the radio system when both this user and the sending user is out of coverage;
   d. Default Conference—the user currently assigned primary broadband conference;
   e. Talk and listen conferences on a first come basis; and
   f. Monitor conferences on a first-come basis.

9. The method of claim 8, for handling audio not passed to the speaker microphone by reason of prioritization to be recorded and noted as available for replay.

10. The method of claim 1, where the speaker microphone responds to commands from the cellular device, consisting of at least one of the following:
    a. A command to open the microphone and pass microphone audio to the cellular device to support hands free communication;
    b. A command to open the serial port on the attached radio and pass data between the serial ports from the serial interface to and from the cellular device;
    c. A command to restore the microphone to PTT button control;
    d. A command to mute the speaker;
    e. A command to unmute the speaker; and
    f. A command to close the serial interface.

11. The method of claim 10, where the speaker microphone opens the serial interface on the land mobile radio.

12. The method of claim 10, where the speaker microphone forwards data from a cellular device to the land mobile radio over the serial interface.

13. The method of claim 10, where the speaker microphone forwards data from the land mobile radio to a cellular device over the serial interface.

14. The method of claim 10, where the speaker microphone terminates the serial connection to the land mobile radio (on command from a cellular device or termination by the radio).

15. The method of claim 10, including where the speaker microphone opens the audio connection for full duplex communication over the audio interface to a cellular device.

16. The method of claim 10, where the speaker microphone terminates the full duplex connection.

* * * * *